US011170917B1

(12) United States Patent
Cergolj et al.

(10) Patent No.: US 11,170,917 B1
(45) Date of Patent: Nov. 9, 2021

(54) ZINC OXIDE VARISTOR CERAMICS

(71) Applicant: RIPD Intellectual Assets Ltd, Nicosia (CY)

(72) Inventors: Mirjam Cergolj, Naklo (SI); Saša Rustja Kosec, Ljubljana (SI); Sodec Jožef, Ljubljana (SI); Andrej Pirih, Ljubljana (SI)

(73) Assignee: RIPD Intellectual Assets Ltd, Nicosia (CY)

( * ) Notice: Subject to any disclaimer, the term of this patent is extended or adjusted under 35 U.S.C. 154(b) by 0 days.

(21) Appl. No.: 17/245,520

(22) Filed: Apr. 30, 2021

Related U.S. Application Data

(63) Continuation of application No. 17/095,497, filed on Nov. 11, 2020.

(51) Int. Cl.
*H01C 7/112* (2006.01)
*H01C 17/065* (2006.01)
*C04B 35/453* (2006.01)

(52) U.S. Cl.
CPC .......... *H01C 7/112* (2013.01); *C04B 35/453* (2013.01); *H01C 17/06526* (2013.01); *H01C 17/06546* (2013.01); *C04B 2235/3217* (2013.01); *C04B 2235/3241* (2013.01); *C04B 2235/3279* (2013.01); *C04B 2235/3284* (2013.01); *C04B 2235/3409* (2013.01); *C04B 2235/442* (2013.01); *C04B 2235/5436* (2013.01); *C04B 2235/5445* (2013.01); *C04B 2235/6565* (2013.01); *C04B 2235/6583* (2013.01); *C04B 2235/96* (2013.01)

(58) Field of Classification Search
CPC .......... C04B 35/453; C04B 2235/3217; C04B 2235/3741; C04B 2235/3779; C04B 2235/3284; C04B 2235/3409; C04B 2235/44296
See application file for complete search history.

(56) References Cited

U.S. PATENT DOCUMENTS

| 5,269,972 A | 12/1993 | Arnold et al. |
| 8,562,859 B2 * | 10/2013 | Kato .............. H01C 17/06546 |
| | | 252/182.33 |

FOREIGN PATENT DOCUMENTS

| CN | 107216140 A | | 9/2017 |
| EP | 961300 | * | 12/1999 |
| GB | 1580549 A | | 12/1980 |
| JP | 04-245602 | * | 9/1992 |
| JP | 07-034403 | * | 4/1995 |
| JP | 2007149775 A | | 6/2007 |
| WO | 2014101030 A1 | | 7/2014 |

OTHER PUBLICATIONS

European search report corresponding to EP Application No. 20213201.5 (4 pages) (dated May 17, 2021).

* cited by examiner

*Primary Examiner* — C Melissa Koslow
(74) *Attorney, Agent, or Firm* — Myers Bigel, P.A.

(57) ABSTRACT

Provided according to embodiments of the invention are varistor ceramic formulations that include zinc oxide (ZnO). In particular, varistor ceramic formulations of the invention may include dopants including an alkali metal compound, an alkaline earth compound, an oxide of boron, an oxide of aluminum, or a combination thereof. Varistor ceramic formulations may also include other metal oxides. Also provided according to embodiments of the invention are varistor ceramic materials formed by sintering a varistor ceramic formulation according to an embodiment of the invention. Further provided are varistors formed from such ceramic materials and methods of making such materials.

21 Claims, 6 Drawing Sheets ically, in addition to ZnO, varistors include dopinclude# ZINC OXIDE VARISTOR CERAMICS

FIELD OF THE INVENTION

The present invention relates to zinc oxide-based ceramic materials. In particular, the present invention relates to zinc-oxide based ceramic materials that may be used in varistors for electrical devices.

BACKGROUND OF THE INVENTION

Zinc oxide (ZnO) varistors are multicomponent ceramic devices with nonlinear current-voltage (I-U) characteristics and high current and energy absorption capabilities. Due to these unique and desirable physical properties and a relatively cost-effective production, ZnO varistors have been used for the protection of electronic components against voltage surges. They have also been used for voltage stabilization over a broad range of voltages, from a few volts to several kilovolts.

Traditionally, in addition to ZnO, varistors include dopants such as metal oxides (e.g., oxides of bismuth, antimony, cobalt, manganese, nickel, and chromium). Some of these dopants may create the nonohmic behavior in ZnO-based varistor ceramics while other dopants may enhance the nonlinear characteristics and help to control microstructure development.

The microstructure of ZnO ceramic materials includes zinc oxide grains. The bulk of the ZnO grain is highly conductive but the intergranular boundary, which may include the metal oxide dopants, may be highly resistive with nonlinear current-voltage (I-U) characteristics. The threshold voltage (i.e., the breakdown voltage per unit thickness) of the varistor ceramics is generally directly proportional to the number of grain boundaries per unit of thickness and therefore is inversely proportional to the ZnO grain size. The size of the ZnO grains depends on factors such as the chemical composition, firing temperature, and time.

Zinc oxide varistors limit voltage changes from transient currents to a certain level. The varistors thus exhibit variable impedance, which depends either on the current flowing through the device or the voltage across the device's terminals. The voltage on the varistor during a transient current voltage disturbance may be called the protection voltage, residual voltage, or clamping voltage. The protection voltage can also be defined as (1) the voltage at which the varistor eliminates the transient current's disruption by connecting to ground or absorbing excess energy; or (2) the maximum voltage across the varistor before eliminating the transient current disturbance. When the varistor reaches the protection voltage, it blocks any further current through the device it protects by diverting the transient current to ground.

In some cases, it may be desirable to lower the protection voltage of a varistor so that more sensitive electrical devices are protected from even small voltage surges. Accordingly, there is a need for new materials and methods for producing varistor ceramic materials having lower protection voltages.

SUMMARY OF THE INVENTION

Provided according to embodiments of the invention are ZnO-based varistor ceramic formulations. It has been found that adding alkali metal compounds and/or alkaline earth metal compounds to the varistor ceramic formulations may provide improved varistor properties, such as, for example, reduced protection voltages. It has also been found that oxides of boron and/or aluminum, added in addition to, or in lieu of, the alkali metal compounds and/or the alkaline earth metal compounds, may provide desirable varistor properties.

Thus, the varistor ceramic formulations of the invention may include an alkali metal compound, an alkaline earth metal compound, or combinations thereof, as minor dopants. Such compounds include, for example, carbonates, nitrates, and oxides of an alkali metal or an alkaline earth metal. The varistor ceramic formulations of the invention may further include oxides of boron and/or aluminum as minor dopants. Examples of such dopants include, but are not limited to, carbonates, nitrates, and oxides of sodium; carbonates, nitrates, and oxides of potassium; carbonates, nitrates, and oxides of lithium; oxides of boron; and oxides of aluminum. In particular embodiments of the invention, the minor dopants include an alkali metal carbonate, such as, for example, sodium carbonate. Furthermore, in particular embodiments, boric acid ($H_3BO_3$) and/or diboron trioxide ($B_2O_3$) may alternatively or additionally be added to the varistor ceramic formulations.

In addition to ZnO as the primary metal oxide and the minor dopants described above, the varistor ceramic formulations of the invention may include other metal oxides known to be useful in varistor formulations. Examples of such additional metal oxides include, for example, bismuth (III) oxide ($Bi_2O_3$), antimony (III) oxide ($Sb_2O_3$), cobalt tertraoxide ($Co_3O_4$), trimanganese tetraoxide ($Mn_3O_4$), nickel (II) oxide (NiO), and/or chromium (III) oxide ($Cr_2O_3$).

Also provided according to embodiments of the invention are varistor ceramic materials formed by sintering a varistor ceramic formulation of the invention. Further provided are varistors including and/or formed from such ceramic materials. Such varistors may have desirable electrical properties, such as a low protection voltage.

In addition, provided according to embodiments of the invention are methods of making varistor ceramic materials and methods of making varistors including such ceramic materials.

BRIEF DESCRIPTION OF THE DRAWINGS

FIG. 3A shows the phase composition for this ceramic material: ZnO, $Bi_2O_3$-rich phase (white), $Zn_7Sb_2O_{12}$ spinel phase (gray), and pores (black). FIG. 3B shows an average grain size of about 7.5 for this ceramic material.

FIG. 4A shows the phase composition of this ceramic material: ZnO, $Bi_2O_3$-rich phase (white), $Zn_7Sb_2O_{12}$ spinel phase (gray), and pores (black). FIG. 4B shows an average grain size of about 9.8 µm for this ceramic material.

FIG. 5A and FIG. 5B show the microstructure of the SV4 varistor ceramic material. FIG. 5A shows the phase composition for this ceramic material: ZnO, $Bi_2O_3$-rich phase (white), $Zn_7Sb_2O_{12}$ spinel phase (gray), and pores (black). FIG. 5B shows an average grain size of about 13.5 µm for this ceramic material.

DETAILED DESCRIPTION OF ILLUSTRATIVE EMBODIMENTS

Figure 1:
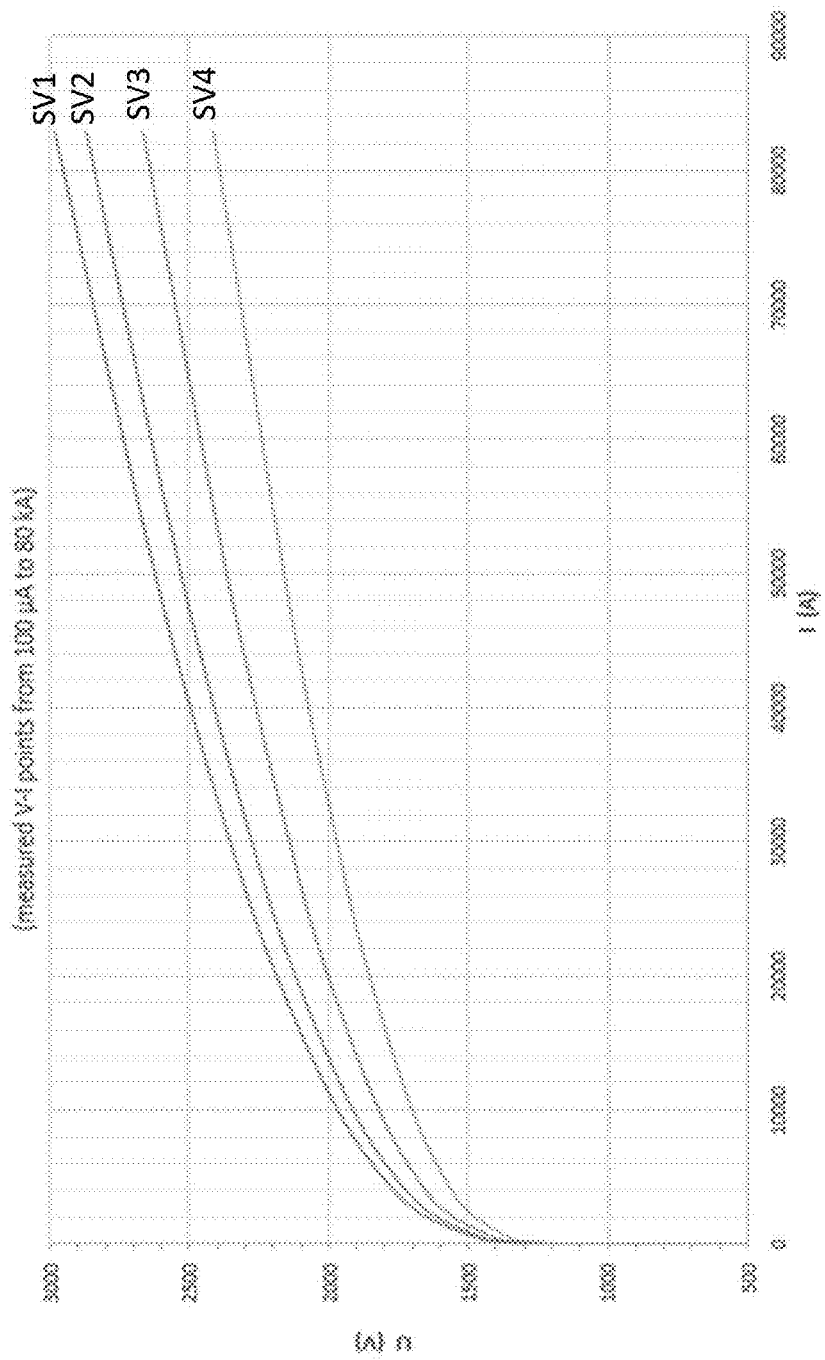
FIG. 1 is a graph showing voltage as a function of impedance for four varistor ceramic materials, SV1, SV2, SV3, and SV4.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

As used herein, the term "total metal and/or metalloid compounds" includes all metal and metalloid compounds in a varistor ceramic formulation. As such, in some embodiments, it includes all components of a varistor ceramic formulation except for the solvent, plasticizer, and/or binder.

As used herein, the term "varistor ceramic formulation" refers to a composition that may be used and/or processed to form varistor ceramic material but has not yet been sintered.

As used herein, the term "granulate" refers to a varistor ceramic formulation that has been dried.

As used herein, the term "formed object" refers to a pressed granulate and may have any suitable shape or dimension. In some embodiments, the formed object is a disc or pellet.

As used herein, the term "varistor ceramic" or "varistor ceramic material" refers to a varistor ceramic formulation (or granulate or formed object) that has been dried, pressed, and sintered.

As used herein, the term "varistor" refers to a varistor ceramic material that has electrodes attached to or in electrical communication therewith.

Varistor Ceramic Formulations

Provided according to embodiments of the invention are varistor ceramic formulations that include zinc oxide (ZnO). The combination of known varistor materials with a minor amount of certain dopants may provide improved varistor properties, such as, for example, reduced protection voltage, relative to materials without such dopants. Such minor dopants include one or more of an alkali metal compound, an alkaline earth metal compound, an oxide of boron, and an oxide of aluminum. The inclusion of these compounds in varistor ceramic formulations may provide varistors having desirable properties, such as reduced protection voltage.

As described above, the primary compound in varistor ceramic formulations of the invention is ZnO, which is typically present in the varistor ceramic formulations at a concentration of greater than 90 mol %, and in some cases, greater than 91, 92, 93, 94, or 95 mol %, based on the total metal and/or metalloid compounds in the formulation. Any suitable ZnO may be used in the varistor ceramic formulations of the invention. However, in some embodiments, the varistor ceramic formulations include a ZnO powder having an average particle size in a range of about 0.2, 0.3, or 0.5 µm to about 0.8, 0.9, or 1 µm, and, in some cases, an average particle size of about 0.5 µm.

As described above, an alkali metal compound and/or an alkaline earth metal compound may be included in varistor ceramic formulations of the invention as a minor dopant. Alternatively or additionally, an oxide of boron and/or aluminum may be included in the varistor ceramic formulations of the invention. As used herein, the alkali metal compound, the alkaline earth metal compound, the oxide of boron, and the oxide of aluminum may collectively be referred to as "minor dopants." In some embodiments, inclusion of at least one minor dopant in the varistor ceramic formulation decreases the protection voltage of the resulting varistor relative to the same varistor without the minor dopant.

As used herein, the term "alkali metal compound" refers to an ionic compound that includes at least one atom in Group 1 of the periodic table as a cation. In particular embodiments, the alkali metal cation is lithium, sodium, or potassium. In particular embodiments, the alkali metal compound includes at least one alkali metal cation and at least one carbonate, nitrate, or oxide anion. In some cases, the alkali metal compound is soluble in water. In such cases, a solution of the compound in water may be useful to disperse the alkali metal and its anion in the zinc oxide (and other dopants), which may provide improved homogeneity of the alkali metal in the resulting varistor ceramic. A water insoluble alkali metal compound may also be used, and in some embodiments, the water insoluble alkali metal compound may be added to the varistor ceramic formulation as a powder. When present as a powder, the particle size may be varied but, in some embodiments, the alkali metal compound powder has an average particle size of less than about 0.1 μm, and in some cases, less than 0.09, 0.08, or 0.07 μm.

As used herein, the term "alkaline earth metal compound" refers to an ionic compound that includes at least one atom in Group 2 of the periodic table as a cation. In particular embodiments, the alkaline earth metal is magnesium or calcium. In particular embodiments, the alkaline earth metal compound includes at least one alkaline earth metal cation and at least one carbonate, nitrate, or oxide anion. In some cases, the alkaline earth metal compound is soluble in water. In such cases, a solution of the compound in water may be useful to disperse the alkaline earth metal and its anion in the zinc oxide (and other dopants), which may provide improved homogeneity of the alkaline earth metal in the resulting varistor ceramic. A water insoluble alkaline earth metal compound may also be used, and in some embodiments, the water insoluble alkaline earth metal compound may be added to the varistor ceramic formulation as a powder. When present as a powder, the particle size may be varied but, in some embodiments, the alkaline earth metal compound powder has an average particle size of less than about 0.1 μm, and in some cases, less than 0.09, 0.08, or 0.07 μm.

As used herein, the term "carbonate" refers to a compound that includes at least one carbonate ($CO_3^{2-}$) or bicarbonate ($HCO_3^-$) anion. In some embodiments, the alkali metal carbonate includes at least one of lithium carbonate ($Li_2CO_3$), sodium carbonate ($Na_2CO_3$), sodium bicarbonate ($NaHCO_3$) and potassium carbonate ($K_2CO_3$). In some embodiments, the alkaline earth metal carbonate includes at least one of magnesium carbonate ($MgCO_3$) and calcium carbonate ($CaCO_3$).

As used herein, the term "nitrate" refers to a compound that includes at least one nitrate ($NO_3^-$) anion therein. In some embodiments, the alkali metal nitrate includes at least one of lithium nitrate ($LiNO_3$), sodium nitrate ($NaNO_3$), and potassium nitrate ($KNO_3$). In some embodiments, the alkaline earth metal nitrate includes at least one of magnesium nitrate ($Mg(NO_3)_2$) and calcium nitrate ($Ca(NO_3)_2$).

As used herein, the term "oxide" refers to a compound that includes at least one oxygen atom as an anion or electronegative atom. In some embodiments, an alkali metal oxide includes at least one of lithium oxide ($Li_2O$), sodium oxide ($Na_2O$), and potassium oxide ($K_2O$). In some embodiments, the alkaline earth metal oxide includes at least one of magnesium oxide (MgO) and calcium oxide (CaO). In some embodiments, an oxide of boron and/or aluminum includes at least one of boric acid ($H_3BO_3$), also referred to as hydrogen borate or orthoboric acid, diboron trioxide ($B_2O_3$), also referred to as boron trioxide, and aluminum (III) oxide ($Al_2O_3$).

In some embodiments, an alkali metal compound, an alkaline earth metal compound, or a combination thereof, may be present in a varistor ceramic formulation of the invention at a concentration in a range of about 10 ppm to about 2000 ppm, based on the total concentration of metal and/or metalloid compounds in the formulation. In some embodiments, an alkali metal compound, an alkaline earth metal compound, or a combination thereof, is present in a varistor ceramic formulation at a concentration in a range of about 10, 50, 100, 150, 200, 250, or 300 ppm to about 500, 550, 600, 650, 700, 750, 800, 850, 900, 950, or 1000 ppm, based on the total concentration of metal and/or metalloid compounds in the formulation.

In some embodiments, the oxide of boron, the oxide of aluminum, or a combination thereof, may be included in a varistor ceramic formulation of the invention at a concentration in a range of about 0.01 mol % to about 0.2 mol %, and in some cases at a concentration in a range of about 0.01, 0.02, 0.03, 0.05, or 0.1 mol % to about 0.15, 0.16, 0.17, 0.18, 0.19 or 0.2 mol % based on the total metal and/or metalloid compounds in the formulation. In some embodiments, oxide powders have an average particle size of less than about 0.1 μm, and in some cases, less than about 0.09, 0.08, or 0.07 μm.

In addition to ZnO and the minor dopants, the varistor ceramic formulations may further include other metal oxides as additional dopants that may enhance the varistor properties, such as, for example, by altering the properties of the intergranular boundaries in the ceramic materials. These metal oxides may also be referred to herein as "additional metal oxide dopants." Examples of such additional metal oxide dopants include, but are not limited to, bismuth (III) oxide ($Bi_2O_3$), antimony (III) oxide ($Sb_2O_3$), cobalt tetraoxide ($Co_3O_4$), trimanganese tetraoxide ($Mn_3O_4$), nickel (II) oxide (NiO), and chromium (III) oxide ($Cr_2O_3$). Any suitable particle size of the additional metal oxide dopants may be used. However, in some embodiments, the average particle size of the additional metal oxide dopants in the varistor ceramic formulation is in a range of about 0.1 μm to about 10 μm. In some embodiments, the average particle size of the additional metal oxide dopants is in a range of about 0.1, 0.2, 0.5, 1, 1.5, 2, 2.5, or 3 μm to about 7, 7.5, 8, 8.5, 9, 9.5, or 10 μm.

The additional metal oxide dopants may be present in the varistor ceramic formulations in any suitable concentration. However, in some embodiments, the following compounds may be present (separately or in any combination thereof) in the following concentration ranges, based on the total metal and/or metalloid compounds in the formulation:

$Bi_2O_3$, at a concentration in a range of about 0.1 mol % to about 1.5 mol %, in some embodiments, in a range of about 0.1, 0.2, 0.3, 0.4, or 0.5 mol % to about 1.0, 1.1, 1.2, 1.3, 1.4 or 1.5 mol %, and in particular embodiments, in a range of about 0.1 mol % to about 1.3 mol % (e.g., in a range of about 0.4 mol % to about 0.8 mol %);

$Sb_2O_3$, at a concentration in a range of about 0.01 mol % to about 2.0 mol %, in some embodiments, in a range of about 0.01, 0.1, 0.3, 0.4, 0.5, or 0.6 mol % to about 1, 1.2, 1.5, 1.6, 1.7, 1.8, 1.9, or 2.0 mol %, and, in particular embodiments, in a range of about 0.3 mol % to about 2.0 mol % (e.g., in a range of about 0.5 mol % to about 0.9 mol %);

$Co_3O_4$, at a concentration in a range of about 0.01 mol % to about 1.0 mol %, and in some embodiments, in a range of about 0.01, 0.05, or 0.1 to about 0.3, 0.4, 0.5, 0.6, 0.7, 0.8, 0.9, or 1.0 mol %, and in particular embodiments, in a range of about 0.01 mol % to about 0.3 mol %;

$Mn_3O_4$, at a concentration in a range of about 0.01 mol % to about 1.0 mol %, and in some embodiments, in a range of about 0.01, 0.02, or 0.05 to about 0.1, 0.2, 0.3, 0.4, 0.5, 0.6, 0.7, 0.8, 0.9, or 1.0 mol %, and in particular embodiments, in a range of about 0.01 mol % to about 0.1 mol %;

NiO, at a concentration in a range of about 0 mol % to about 1.0 mol %, and in some embodiments, in a range of about 0, 0.01, 0.05, or 0.1 mol % to about 0.2, 0.3, 0.4, 0.4, 0.5, 0.6, 0.7, 0.8, 0.9, or 1.0 mol %, and in particular embodiments, in a range of about 0.05 mol % to about 0.2 mol %; and/or $Cr_2O_3$, at a concentration in a range of about 0 to about 1.0 mol %, and in some embodiments, in a range of about 0, 0.01, 0.02, 0.03, or 0.04 mol % to about 0.05, 0.1, 0.2, 0.3, 0.4, 0.5, 0.6, 0.7, 0.8, 0.9, or 1.0 mol %, and in particular embodiments, in a range of about 0.01 to about 0.05 mol %.

In particular embodiments of the invention, the varistor ceramic formulation includes the following compounds in the following concentration ranges (based on the total metal and/or metalloid compounds in the formulation): $Bi_2O_3$ at a concentration in a range of about 0.1 mol % to about 1.5 mol % (and in some embodiments, in a range of about 0.1 mol % to about 1.3 mol %); $Sb_2O_3$ at a concentration in a range of about 0.01 mol % to about 2.0 mol % (and in some embodiments, in a range of about 0.3 mol % to about 2.0 mol %); $Co_3O_4$ at a concentration in a range of about 0.01 mol % to about 1.0 mol %; $Mn_3O_4$ at a concentration in a range of about 0.01 mol % to about 1.0 mol %; NiO at a concentration in a range of about 0 mol % to about 1.0 mol %; and $Cr_2O_3$ at a concentration in a range of about 0 to about 1.0 mol %; $H_3BO_3$, $B_2O_3$, or a combination thereof, at a concentration in a range of about 0.01 mol % to about 0.2 mol %; and $Na_2CO_3$ at a concentration in a range of about 20 ppm to about 1000 ppm (and in some embodiments, in a range of about 200 to 600 ppm); with the remainder being ZnO.

In particular embodiments of the invention, the varistor ceramic formulation includes the following compounds in the following concentration ranges (based on the total metal and/or metalloid compounds in the formulation): $Bi_2O_3$ at a concentration in a range of about 0.4 mol % to about 0.8 mol %; $Sb_2O_3$ at a concentration in a range of about 0.5 mol % to about 0.9 mol %; $Co_3O_4$ at a concentration in a range of about 0.01 mol % to about 0.3 mol %; $Mn_3O_4$ at a concentration in a range of about 0.01 mol % to about 0.1 mol %; NiO at a concentration in a range of about 0.05 mol % to about 0.2 mol %; and $Cr_2O_3$ at a concentration in a range of about 0.01 to about 0.05 mol %; $H_3BO_3$, $B_2O_3$, or a combination thereof, at a concentration in a range of about 0.1 mol % to about 0.2 mol %; and $Na_2CO_3$ at a concentration in a range of about 200 to about 600 ppm; with the remainder being ZnO.

A varistor ceramic formulation described above may be mixed with a solvent, binder and/or plasticizer prior to sintering. As such, in some embodiments, the varistor ceramic formulations may further include a solvent, binder, and/or plasticizer. Although any suitable solvent may be used, in some cases, water, or an aqueous solution may be used as the solvent. Additionally, although many suitable binders and plasticizers are known in the art, in particular embodiments, polyvinylalchol (PVA) is included as a binder and polyethylene glycol (PEG) is included as a plasticizer. In general, the solvent is present in the varistor ceramic formulation at a concentration in a range of about 20, 25, 30, or 25% to about 60, 65, 70, 75, or 80% by weight of the total formulation; and the binder and/or plasticizer together are present in the formulation at a concentration that is less than about 4% by weight (e.g., less than about 4, 3, 2.5 or 2% by weight), based on the total weight of the formulation. The binder and/or plasticizer may be added to the solvent before the metal and/or metalloid compounds, with the metal and/or metalloid compounds, and/or after the metal and metalloid compounds in the formulation.

Also provided according to embodiments of the invention are dried varistor ceramic formulations, also referred to as a granulate. In some embodiments, the granulate has an average particle size distribution in a range of about 5 μm to about 300 μm, such as, for example, an average particle size in a range of about 5, 10, 15, 20, 25, 30, or 50 μm to about 250, 260, 270, 280, 290, or 300 μm. Also provided are formed objects created by pressing the granulate. In some embodiments, the formed object is in the shape of a disk or pellet. In some embodiments, the formed objects have a green body density in a range of about 40 to about 70% of the theoretical sintered density of the body, including a green body density between about 40, 42, 45, or 50% to about 60, 62, 65, or 70% of the theoretical sintered density of the body.

Varistor Ceramic Materials and Varistors Including the Same

The varistor ceramic formulations may be processed as described herein to form varistor ceramic materials. The relative atomic concentration of the metals and/or metalloids in the varistor ceramic materials is the same as that in the varistor ceramic formulations. That is, the metals and metalloids are not removed during the ceramic formation process. Thus, provided herein are varistor ceramic materials that include the relative atomic concentrations of metals and metalloids present in the varistor ceramic formulations of the invention. However, some anions, including carbonates and nitrates, may partially or completely decompose during the sintering process and so are not present in the varistor ceramic materials. As such, the molar concentrations of the components in the varistor ceramic formulations and the final ceramic materials may be different. Additionally, after the drying and sintering processes (described below), the solvent, binder, and/or plasticizer may be substantially or essentially removed and so the concentration of varistor ceramic formulations that include solvents, binders, and/or plasticizers may vary substantially from the final ceramic materials wherein the solvents, binders, and plasticizers are no longer present or are only present in trace amounts.

The varistor ceramic materials include zinc oxide grains, as described herein. The ZnO grain size may vary with the composition and the method of preparation, including the heating and/or cooling processes. Thus, many possible grain sizes are within the scope of the invention. However, in some embodiments, the varistor ceramic has an average ZnO grain size in a range of from about 2, 3, 4, 5, or 10 μm to about 20, 25, 28, 29 or 30 μm.

The varistor ceramic materials formed by the methods described herein may have desirable electrical properties. Such properties may be ascertained by metallization of the formed objects. As such, also provided herein are varistor ceramics including a composition of the invention and metal electrodes on or in electrical connection to the ceramics. The metallization process is known in the art and any suitable electrode material may be used. However, in particular embodiments, the electrode is silver or aluminum. In some cases, the thickness of the electrode layer is in a range of about 1 μm to about 80 μm, including about 1, 2, 5, 10, or 30 μm to about 50, 60, 70, 75, or 80 μm. In some cases, varistor electrodes may include or consist of metallization layers on opposed outer surfaces of the varistor body.

The properties of the varistor ceramic may vary depending on the composition, method of formation, the type of granulate, and the like. However, in some embodiments, the varistor ceramic has a density in a range of about 90 to about 100% of the theoretical density (such as about 90, 92, or 94% to about 96, 97, 98, 99 or 100%), and in particular embodiments, in a range of about 94% to about 98% of the theoretical density. The theoretical density of the ZnO-based varistor ceramics is approximately 5.6 g/cm$^3$. Thus, in some embodiments, the density of the ceramic material is in a range of about 5.04 g/cm$^3$ to about 5.6 g/cm$^3$, and in some cases, in a range of about 5.26 g/cm$^3$ to about 5.49 g/cm$^3$.

In some embodiments, varistors formed from the varistor ceramics according to the invention may have desirable stability profiles. The stability may be measured by a variety of methods. Typically, the stability is tested by applying a maximum continuous operating voltage of the varistor under a certain condition, such as a specific temperature (e.g., 85° C. or 115° C.), and/or under a combination of temperature and humidity conditions (e.g., 40° C./relative humidity in a range of 95-98%). The leakage current over time is then measured. In some embodiments, the varistor's leakage current has a value not exceeding twice the initial value (and in some cases, a value not exceeding 1.5, 1.6, 1.7, 1.8, or 1.9 times the initial value) within the first 5 hours of the stability test. In some embodiments, the varistor's leakage current decreases less than about 20 μA over at least about 480 hours when a maximum continuous operating voltage is applied at about 40° C. with a relative humidity in a range of about 95 to about 98%.

The varistors formed from the varistor ceramics according to the invention may have a protection voltage ($U_p$) in a range of about 200 V to about 265 V as measured at 5 kA (8/20 μs), such as in a range of about 200, 205, 210, 215, or 220 V to about 250, 255, 260 or 265 V. The varistors formed from a ceramic material of the invention may have a $U_p$ in a range of about 200 V to about 300 V as measured at 10 kA (8/20 μs), such as in a range of about 200, 205, 210, 215, or 220 V to about 280, 285, 290, 295, or 300 V. In particular embodiments, the varistor may have a protection voltage ($U_p$) of about 265 V or less (e.g., about 260, 255, 250, 240, 230, or 220 V or less) as measured at 5 kA (8/20 μs) and/or of about 300 V or less (e.g., about 295, 290, 280, 270 or 260 V or less) as measured at 10 kA (8/20 μs). An 8/20 waveform produces a current surge that reaches a maximum value in 8 μs and decays to 50% of maximum current in 20 μs, while an 10/350 waveform produces a current surge that reaches a maximum value ($I_{MAX}$) in 10 μs and decays to 50% of maximum current in 350 μs. These waveforms are considered to approximate an indirect lightning strike and direct lightning strike, respectively.

In some cases, the energy absorption capability of a varistor according to an embodiment of the invention is in a range of about 0.4 kJ/cm$^3$ to 0.5 kJ/cm$^3$, but in some embodiments, may be as high as about 0.7 kJ/cm$^3$ to about 0.9 kJ/cm$^3$. Thus, the energy absorption capability of the varistor may be in a range of about 0.4, 0.45, 0.5, or 0.55 kJ/cm$^3$ to about 0.7, 0.75, 0.8, 0.85, or 0.9 kJ/cm$^3$. The energy absorption of the varistor may also or alternatively comply with existing standards for surge protective devices including ZnO varistors, e.g., IEC/EN 61643-11, EN 50539-11, and/or IEC/EN 61643-31, which protocols are incorporated herein by reference.

In some embodiments of the invention, varistors formed from a ceramic material of the invention may have a specific resistance in a range of about 11 Ωcm to about 16 Ωcm (e.g., about 11.8 Ωcm to about 14.9 Ωm) measured at 0.8 kA (8/20 μs) and with a 100 A/cm$^2$ current density. In some embodiments, varistors formed from a ceramic material of the invention may have a specific resistance in a range of about 2 Ωcm to about 4 Ωcm (e.g., about 2.4 Ωcm to about 3 Ωm) measured at 5 kA (8/20 μs) with a 625 A/cm$^2$ current density. In some embodiments, varistors formed from a ceramic material of the invention may have a specific resistance in a range of about 1 Ωcm to about 2 Ωcm (e.g., about 1.3 Ωcm to about 1.7 Ωm) measured at 10 kA (8/20 μs) with a 1250 A/cm$^2$ current density.

According to some embodiments of the invention, the protection voltage ($U_p$) of a varistor may be influenced by the ohmic properties of varistor ceramics. The current-voltage (I-U) characteristics of a varistor may include three primary areas: 1) pre-breakdown region (ohmic), which corresponds to voltages below the nominal voltage ($U_N$) of the varistor where high resistance of varistor ceramics is determined by electrostatic barriers at the grain boundaries; 2) non-linear region above the nominal voltage ($U_N$), which is characterized by the "fall" of electrostatic barriers and varistor ceramics turn into a high conductive state, so that current increases by several orders of magnitude with a light change in voltage; and 3) high currents region or upturn region, which is characterized by the varistor ceramics returning to have the nature of an ohmic resistor and its current-voltage (I-U) characteristics are determined by the resistivity of the ZnO grains.

The grain resistivity in ZnO ceramics at room temperature is approximately 0.6 Ωcm and it does not affect the current-voltage (I-U) characteristic of a ZnO varistor up to a current density of approximately 10 Acm$^{-2}$. However, above a current density of approximately 100 Acm$^{-2}$, the nonlinearity of the I-U characteristic may be significantly decreased because of a strong decrease in the nonlinear resistance of the near-surface area of the ZnO grain. At high currents this resistance may become comparable with the linear resistance of the interior part of the ZnO grain. Therefore, at high currents, the bulk resistance of a ZnO grain (connected in series to the nonlinear resistance of the near-surface layer), which is based on a thickness of the ZnO material, controls the I-U characteristic. The decrease in the nonlinearity of I-U characteristic at high currents may lead to an undesirable increase in the protection voltage ($U_p$). Therefore, control of the grain resistivity may be used to generate a desired the protection voltage ($U_p$) for a varistor. The minor dopants provided in varistor ceramic formulations of the invention may allow for fine tuning the charge balance in ZnO grains and the grain boundaries and may contribute to the desirable electrical and energy characteristics of the ceramics.

Also provided according to embodiments of the invention are overvoltage protection devices including a varistor ceramic material or varistor according to an embodiment of the invention.

Methods of Synthesizing Varistor Ceramic Materials

Provided according to embodiments of the invention are methods of preparing a varistor ceramic material that include mixing and homogenizing a varistor ceramic formulation according to an embodiment of the invention; drying the formulation and pressing it into a formed object such as a disk or pellet; and then sintering the formed object to provide the varistor ceramic material. The varistor ceramic material may then be metallized to create a varistor. Each of these steps is discussed in further detail below.

In some embodiments, a varistor ceramic formulation according to an embodiment of the invention is mixed and/or homogenized. If the varistor ceramic formulation initially does not include a solvent, binder, and/or plasticizer, the process may include mixing the metal oxides and minor dopants with a solvent and, optionally, a binder and/or plasticizer, as described herein. In some embodiments, the ZnO, the minor dopants, and any additional metal oxide dopants are first mixed with a solvent and then later a binder and/or plasticizer is added. In some embodiments, all of the components may be mixed at one time, and in some embodiments, the binder and/or plasticizer may be added to the solvent before the metal and/or metalloid compounds are added. The ZnO, the minor dopants, and any additional metal oxide dopants (and optionally, a binder and/or plasticizer) and a solvent as mixed may form a slurry. The varistor slurry may then be mixed or homogenized for a suitable time, and in some cases for at least 20 hours (e.g., at least 20, 22, 24, 26, or 30 hours). In particular embodiments, the materials are milled with a ball milling apparatus for a time in a range of 1 to 72 hours, such as for about 1, 2, 5, 10, 15, 20, or 25 hours to about 60, 62, 64, 66, 68, 70, or 72 hours.

In some embodiments, the homogenized varistor ceramic formulation (e.g., a slurry) is spray dried to thereby form a granulate. The drying processes for varistor compositions are known in the art, and any suitable method may be used, but in some embodiments, the varistor ceramic formulation is dried at a temperature in a range of about 110° C. to about 250° C., such as a temperature in a range of about 110, 115, 120, 125, or 130° C. to about 225, 230, 235, 240, 245 or 250° C. In some embodiments, the dried granulate has low water content (e.g., less than about 0.3 weight % of the granulate).

The granulate may be pressed to create a formed object such as a pellet or disk. In some cases, the diameter of the pellet is in a range of about 5 mm to about 100 mm, such as in a range of about 5, 10, 15, 20, or 25 mm to about 80, 85, 90, 95, 100 mm, and the thickness is below about 15 mm (e.g., less than about 15, 12, 10, or 5 mm). In some embodiments, after pressing, the formed object has a green body density in a range of about 40 to about 70% of the theoretical sintered density of the formed object, such as a green body density in a range of about 40, 42, 45, or 50% to about 60, 62, 65, or 70% of the theoretical sintered density of the formed object.

The formed object may be sintered to form a varistor ceramic of the invention. In some embodiments, the formed object may be sintered (e.g., in a kiln) at a temperature in the range of about 1100 to about 1300° C. (e.g., between about 1100, 1110, 1120, or 1150° C. to about 1250, 1260, 1270, 1280, 1290 to 1300° C.), and in particular embodiments, in a range of about 1150° C. to about 1250° C., in an oxygen environment. The formed object may be sintered for any suitable time but in some embodiments, the formed object is sintered for a time in a range of about 0.5 to about 10 hours (e.g., about 0.5, 1, 2, 3 to about 4, 5, 6, 7, 8, 9 or 10 hours), and in particular embodiments, in a range of about 1 to about 4 hours, to provide a ceramic material. In some embodiments, after sintering the mixture, the ceramic material may be cooled to a temperature of about 850° C. to about 1000° C., and in some embodiments, at a temperature in a range of about 850° C. at a first cooling rate of at least about 10, 11, 12, 13, 14, or 15° C./min. In some embodiments, the ceramic material may then be cooled at a second cooling rate of less than about 3, 2 or 1° C./min until the temperature is below about 200° C.

The sintered ceramic material be used to form a varistor by applying or attaching an electrode material, such as after the cooling process. In some embodiments, the electrode includes silver and is formed, for example, using a silver electrode screen printing process. As another example, an aluminum electrode may be used. The electrodes may have any suitable thickness, but in some cases, the electrode layer may have a thickness in a range of about 10 μm and about 20 μm, such as in a range of about 10, 11, 12, 13, or 15 μm to about 16, 17, 18, 19, or 20 μm. In some embodiments, the metallization process occurs using a firing temperature in a range of between about 500° C. to about 700° C., and for a time of approximately 5 minutes to 30 minutes, but any suitable method may be used. Subsequently, soldering of the metal electrode (typically on two opposing surfaces) and coating may be performed to prepare the varistor.

Some embodiments of the invention may provide a ZnO varistor ceramic formulation that includes an alkali metal compound, an alkaline earth metal compound (e.g., sodium carbonate), or a combination thereof, at a concentration in a range of about 10 ppm to about 2000 ppm based on the total metal and/or metalloid compounds in the formulation. The formulation may be heated at a temperature in a range of about 1100° C. to about 1200° C. in an atmosphere including oxygen to produce the ceramic material. After heating the formulation, the ceramic material may be cooled to a temperature in a range of about 850° C. to 1000° C. at a first cooling rate of at least about 15° C./min. The ceramic material may then be cooled at a second cooling rate of less than about 3° C./min until a temperature of 200° C.

Some embodiments of the invention may provide a ZnO varistor ceramic formulation that includes an alkali metal compound, an alkaline earth metal compound, or a combination thereof, at a concentration in a range of about 300 ppm to about 600 ppm based on the total metal and/or metalloid compounds in the formulation. The formulation may be heated at a temperature in a range of about 1100° C. to about 1200° C. in an atmosphere including oxygen to produce the ceramic material. After heating the formulation, the ceramic material may be cooled to a temperature of about 850° C. at a first cooling rate of at least about 15° C./min. The ceramic material may then be cooled at a second cooling rate of less than about 3° C./min until a temperature of 200° C.

EXAMPLES

1. Powder Preparation

Four varistor ceramic formulations were prepared (SV1, SV2, SV3, and SV4). First, a wet mixing and homogenization in water of the oxides and carbonates/nitrates was performed. More than 90 mol % of the mixture is ZnO, with the additional additives being added in the concentrations shown in Table 1. The average size of the zinc oxide particles was below about 1 μm. During mixing, an organic binder (PVA) and plasticizer (PEG) were added. The total content of the organic compounds is below 4 wt %. The formulations were mixed and homogenized for 20 hours.

TABLE 1

Varistor Ceramic Formulations

|  | SV1 (mol %) | SV2 (mol %) | SV3 (mol %) | SV4 (mol %) |
|---|---|---|---|---|
| $Bi_2O_3$ | 0.68 | 0.68 | 0.68 | 0.68 |
| $Sb_2O_3$ | 0.71 | 0.71 | 0.71 | 0.71 |

TABLE 1-continued

Varistor Ceramic Formulations

|  | SV1 (mol %) | SV2 (mol %) | SV3 (mol %) | SV4 (mol %) |
|---|---|---|---|---|
| $Co_3O_4$ | 0.12 | 0.12 | 0.12 | 0.12 |
| $Mn_3O_4$ | 0.05 | 0.05 | 0.05 | 0.05 |
| NiO | 0.15 | 0.15 | 0.15 | 0.15 |
| $Cr_2O_3$ | 0.02 | 0.02 | 0.02 | 0.02 |
| $B_2O_3$ | 1600 ppm | 1600 ppm | 1600 ppm | 1600 ppm |
| $Na_2CO_3$ | 0 | 50 ppm | 1000 ppm | 300 ppm |
| ZnO | Remainder* | Remainder* | Remainder* | Remainder* |

*Remainder of formulation to 100 mol %, exluding solvent, binder, and plasticizer.

2. Drying

The wet varistor mixtures from step 1, also referred to as metal oxide slurries, were than dried with an air atomizer (spray dryer). The drying temperature was in a range of about 140 to about 170° C. The granulate was inspected in order to determine the average particle size and humidity content. The average particle size of the granulate was in a range of about 50 μm to about 150 μm and the water content was below about 0.3% by weight.

3. Pressing

Each of the granulates was pressed into pellets having a diameter of about 25 mm to about 35 mm and a thickness below about 4 mm. The green pellets had a green body density between 60 to 65% of the theoretical sintered density of the body.

4. Sintering

The pellets were then heated to a temperature of about 1150° C. to about 1300° C., such as in a range of about 1150° C. to about 1250° C., in an oxidative atmosphere. For each of the four formulations, the proper heating protocol was determined. The density of sintered pellets was between about 92% to about 98% of the theoretical maxima. The firing times and cooling procedures for each sample are shown in Table 2 below.

5. Metallization

Silver electrode screen printing was performed after sintering. The thickness of the silver electrode layer was about 10 μm to about 20 μm. The peak firing temperature for each sample was about 620° C. to about 700° C., and firing was performed for about 10 to about 15 minutes. The procedure for each sample is shown in Table 2.

TABLE 2

Firing, Cooling, and Metallization Procedures

|  | SV1 | SV2 | SV3 | SV4 |
|---|---|---|---|---|
| Firing temperature (Preferred Range) | 1100-1300° C. (1180°-1270° C.) | 1100-1300° C. (1180°-1270° C.) | 1100-1300° C. (1180°-1270° C.) | 1100-1200° C. (1120°-1170° C.) |
| Cooling Procedure | Cool to 850° C. at a rate of at least 10° C./min and then slow cooling <3° C./min up to a temperature below 200° C. | Cool to 850° C. at a rate of at least 10° C./min and then slow cooling <3° C./min up to a temperature below 200° C. | Cool to 850° C. at a rate of at least 10° C./min and then slow cooling <3° C./min up to a temperature below 200° C. | Cool to 850° C. at a rate of at least 15° C./min and then slow cooling <3° C./min up to a temperature below 200° C. |
| Metallization | Perform at a temperature below 700° C., and slow cooling <3° C./min up to a temperature below 200° C. | Perform at a temperature below 700° C., and slow cooling <3° C./min up to a temperature below 200° C. | Perform at a temperature below 700° C., and slow cooling <3° C./min up to a temperature below 200° C. | Perform at a temperature below 700° C., and slow cooling <3° C./min up to a temperature below 200° C. |

6. Measurements of Electrical Parameters

Figure 2:
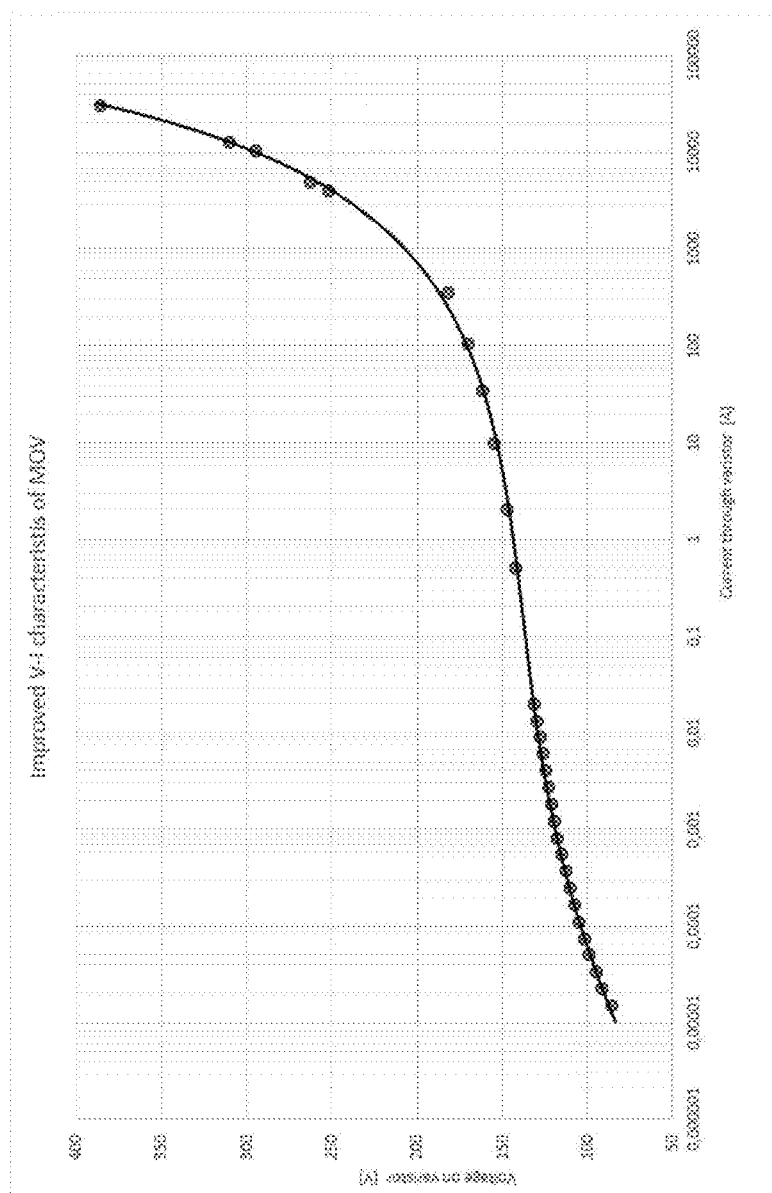
FIG. 2 is a graph showing voltage as a function of current for the SV4 varistor ceramic material.

Varistors SV1-SV4 were formed as described above. Next, various electrical measurements were performed to determine certain characteristics of the varistor ceramic materials including varistor voltage ($U_n$) at 1 mA, leakage current ($I_L$) at DC voltage applied, nonlinear coefficient ($\alpha$), protection voltage ($U_p$) at 5 kA, 20 kA and up to 100 kA, as shown in Table 3. In addition, characterization of voltage as a function of impedance was carried out at a wide impedance range from about 100 μA to about 80 kA. FIG. 1 shows the V-I characteristics of the varistors formed from ceramic materials SV1-SV4. FIG. 2 shows the V-I characteristics of SV4.

TABLE 3

Electrical parameters of SV1, SV2, SV3 and SV4 varistors

| Specimen | $Na_2CO_3$ (ppm) | $U_n$ at 1mA (V) | Alpha $\alpha$ | $I_L$ (mA) | $U_p$ at 5kA (8/20us) (V) | $U_p$ at 10kA (8/20us) (V) |
|---|---|---|---|---|---|---|
| SV1 | 0 | 120 | 30 | 20 | 268 | 301 |
| SV2 | 50 | 118 | 21 | 45 | 260 | 285 |
| SV3 | 1000 | 115 | 23 | 52 | 225 | 246 |
| SV4 | 300 | 111 | 21 | 48 | 217 | 238 |

The specific resistivity of the four ceramic formulations (SV1, SV2, SV3, and SV4) was measured

TABLE 4

Specific resistivity $\rho(\Omega\ cm)$ of the varistors SV1, SV2, SV3, and SV4 in response to 8/20 µs current pulses

| $I_{8/20}$ (kA) | J (A/cm$^2$) | S1 $\rho$ ($\Omega$ cm) | S2 $\rho$ ($\Omega$ cm) | S3 $\rho$ ($\Omega$ cm) | S4 $\rho$ ($\Omega$ cm) |
|---|---|---|---|---|---|
| 0.8 | 100 | 14.9 | 14.1 | 12.2 | 11.8 |
| 5 | 625 | 3.0 | 2.9 | 2.5 | 2.4 |
| 10 | 1250 | 1.7 | 1.6 | 1.4 | 1.3 | in response to three different current 8/20 µs current pulses. As shown in Table 4, the fourth formulation, SV4, has the lowest specific resistivity of the four different formulations.

7. Typical Microstructures of Proposed Varistor Ceramics

Figure 3B:
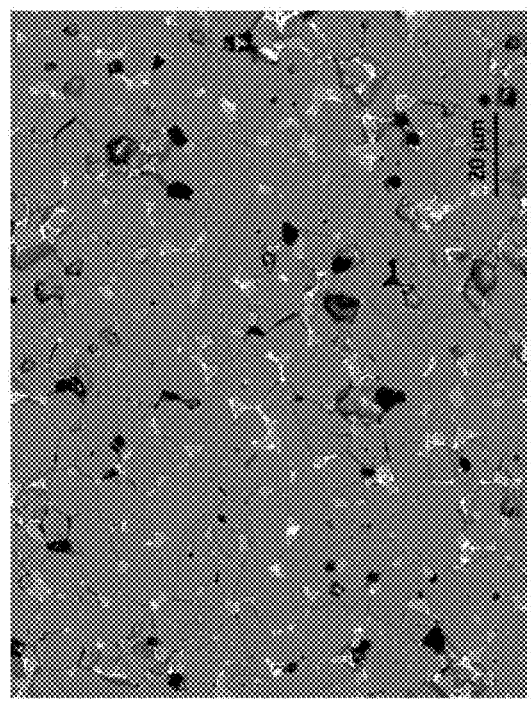
FIG. 3A and FIG. 3B show the microstructure of the SV2 varistor ceramic material.
Figure 3A:
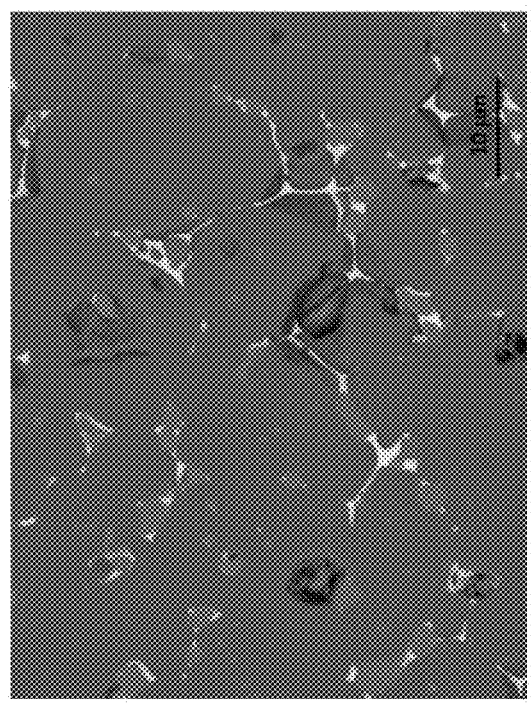
Figure 4B:
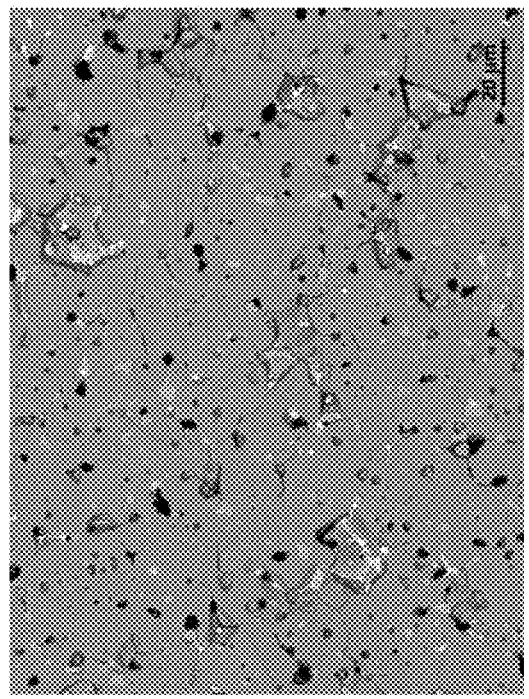
FIG. 4A and FIG. 4B show the microstructure of the SV3 varistor ceramic material.
Figure 4A:
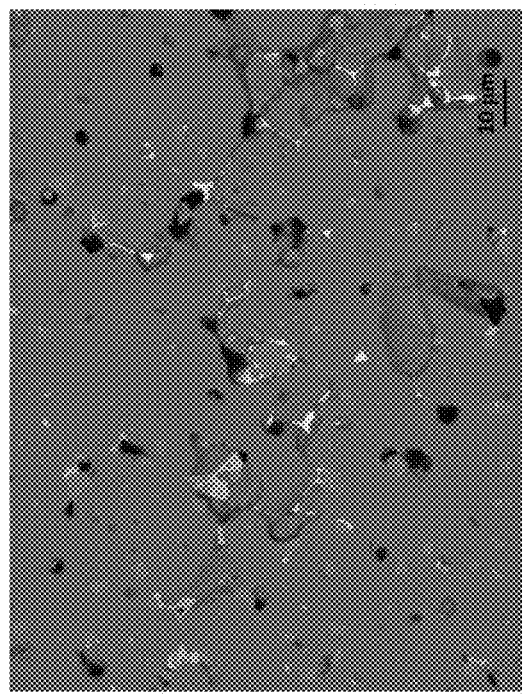
Figure 5A:
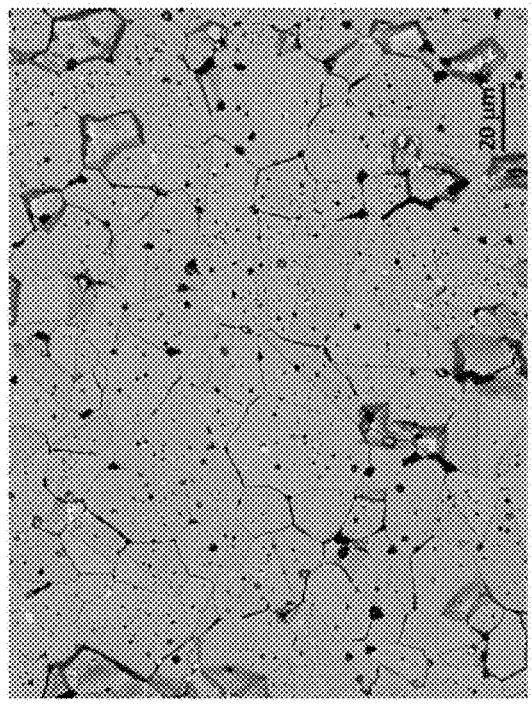
Figure 5A:
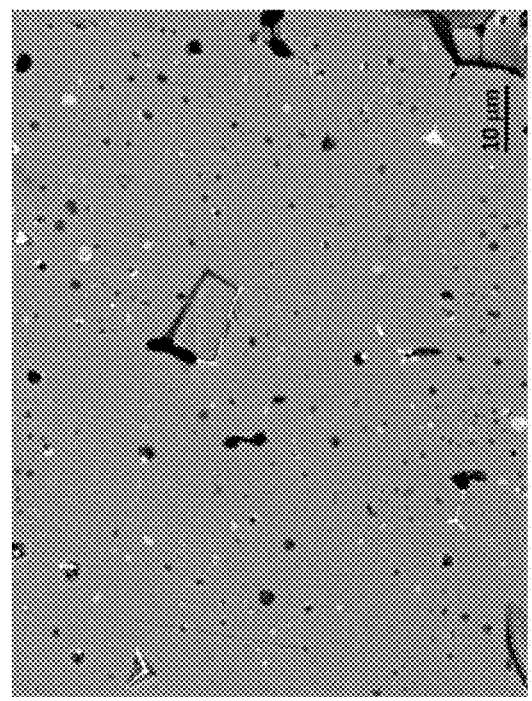

The microstructure (e.g., phase compositions and grain size) of the varistor ceramic materials varied with the amount and ratio of additional metal oxide dopants (oxides of Bi, Sb, Co, Mn, Ni, Cr). Without being bound by any theory, the $Na_2CO_3$ was believed to tune the charge balance in ZnO grains and the grain boundaries and contribute to the electrical and energy characteristics of the ceramics. FIGS. 3-5 show the microstructures of SV2, SV3, and SV4, respectively.

Figure 6:
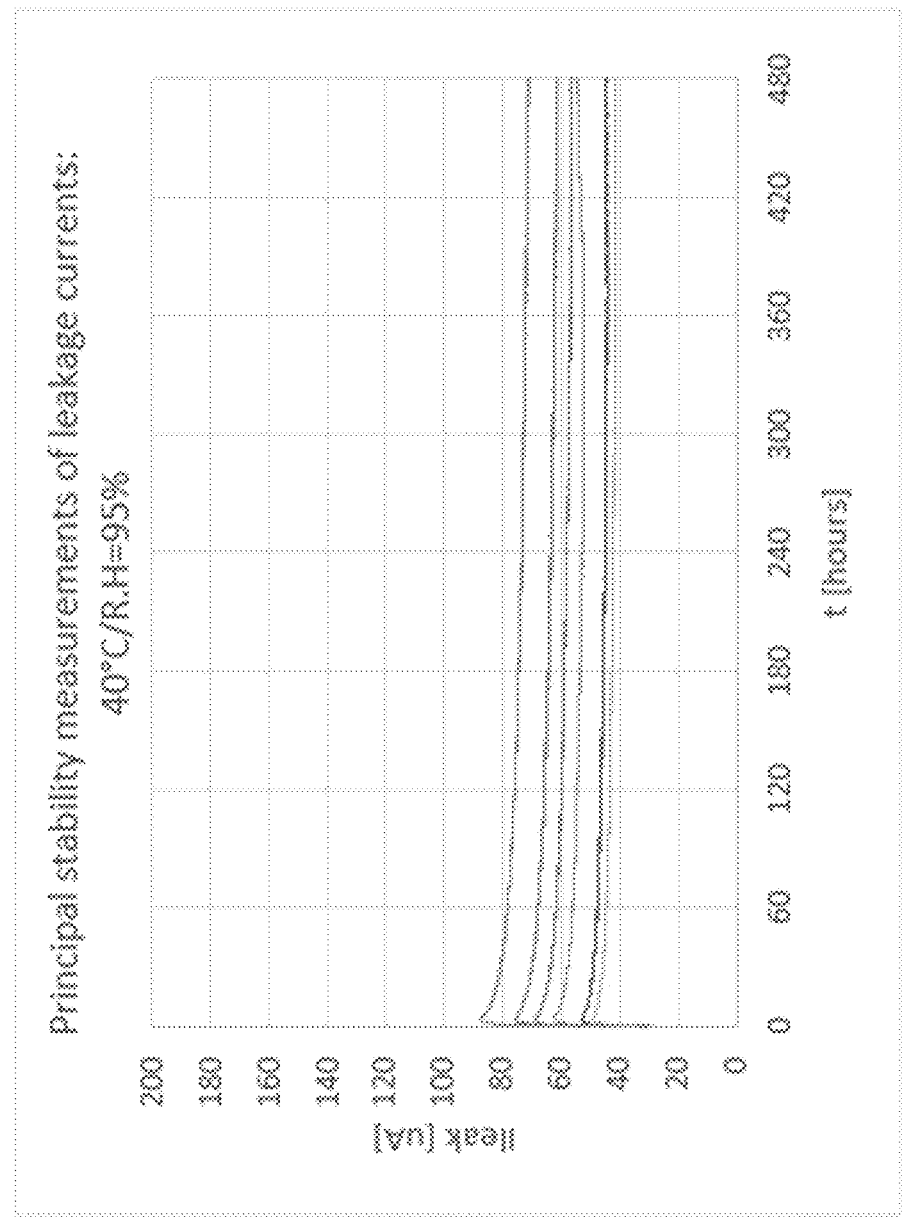
FIG. 6 is a graph of the leakage current over time for six different samples of the SV4 ceramic material.

The stability/aging of varistor samples with composition SV4 was determined by applying a maximum continuous operating voltage on the varistor at 40° C. and a relative humidity in the range of 95-98% and measuring the leakage current over time. Simultaneously 6 pieces of ceramics with composition SV4 from the same batch were aged and measured to evaluate reproducibility of results. Leakage current can vary between varistors based on a variety of factors including, for example, the V-I curve in a low current-voltage range, environmental conditions, such as temperature and humidity, and the measurement method used, e.g., different voltages used in evaluating leakage current. FIG. 6 shows leakage plots for each ceramic sample of the composition SV4 and it can be seen that the results were reproducible. That is, the leakage current measured for each ceramic sample is generally stable over time. FIG. 6 shows measurements of ceramic samples prepared from composition SV4 from the same batch; vertical spread of the curves shows the possible range of leakage current of varistors with the same composition from the same batch, while the same shape of the curves over time (i.e., the curves are running parallel to each other) indicates that all varistors have similar aging behavior and time stability. The obtained range of leakage current of varistors between 40 uA and 90 uA is within expected values and below problematic values, and the shape of the curves indicates high aging stability that is improved with composition SV4.

Analyzing the measurements summarized in the Table 3, the following conclusion is formulated: the lowest protection voltage, $U_p$, is achieved in the varistor SV4 type where the $Na_2CO_3$ is added at a concentration of 300 ppm. The low $U_p$ value was achieved with the particular varistor ceramic formulations without affecting the nominal voltage and non-linearity of the varistor ceramics. Including sodium carbonate and diboron trioxide in the varistor ceramic formulations, in addition to an optimized sintering in oxygen procedure, produced improved varistors materials.

While the present invention has been disclosed with reference to certain embodiments, numerous modifications to the described embodiments are possible without departing from the sphere and scope of the present invention, as defined in the following claims. Accordingly, it is intended that the present invention not be limited to the described embodiments, but that it has the full scope defined by the language in the claims.

We claim:

1. A zinc oxide (ZnO) based varistor ceramic formulation comprising:
   $Bi_2O_3$ at a concentration in a range of about 0.1 mol % to about 1.5 mol %;
   $Sb_2O_3$ at a concentration in a range of about 0.01 mol % to about 2.0 mol %;
   $Co_3O_4$ at a concentration in a range of about 0.01 mol % to about 1.0 mol %;
   $Mn_3O_4$ at a concentration in a range of about 0.01 mol % to about 1.0 mol %;
   NiO at a concentration in a range of about 0 mol % to about 1.0 mol %;
   $Cr_2O_3$ at a concentration in a range of about 0 mol % to about 1.0 mol %;
   $B_2O_3$, $H_3BO_3$, or a combination thereof, at a concentration in a range of about 0.01 mol % to about 0.2 mol %;
   $Na_2CO_3$ at a concentration in a range of about 20 ppm to about 1000 ppm; and
   ZnO to 100 mol % based on the total metal and metalloid compounds present in the ZnO based varistor ceramic formulation.

2. The ZnO based varistor ceramic formulation of claim 1, further comprising at least one compound selected from the group consisting of lithium carbonate, sodium bicarbonate, magnesium carbonate, calcium carbonate, and potassium carbonate, wherein the at least one compound is present in the ZnO based varistor ceramic formulation at a concentration in a range of about 10 ppm to about 2000 ppm based on the total metal and metalloid compounds in the ZnO based varistor ceramic formulation.

3. The ZnO based varistor ceramic formulation of claim 1, further comprising an oxide of aluminum at a concentration in a range of about 0.01 mol % to about 0.2 mol %.

4. The ZnO based varistor ceramic formulation of claim 1, wherein the formulation comprises boric acid.

5. The ZnO based varistor ceramic formulation of claim 1, wherein the $Na_2CO_3$ is present at a concentration in a range of about 200 ppm to about 600 ppm based on the total metal and metalloid compounds present in the varistor ceramic formulation.

6. The ZnO based varistor ceramic formulation of claim 1, wherein the $Na_2CO_3$ is present at a concentration in a range of about 100 ppm to about 1000 ppm based on the total metal and metalloid compounds present in the varistor ceramic formulation.

7. The ZnO based varistor ceramic formulation of claim 6, wherein the ZnO is present at a concentration of about 90 mol % or more based on the total metal and metalloid compounds present in the varistor ceramic formulation.

8. The ZnO based varistor ceramic formulation of claim 1, wherein
   the concentration of $Bi_2O_3$ is in a range of about 0.4 mol % to about 0.8 mol %;
   the concentration of $Sb_2O_3$ is in a range of about 0.5 mol % to about 0.9 mol %;
   the concentration of $Co_3O_4$ is in a range of about 0.01 mol % to about 0.3 mol %;
   the concentration of $Mn_3O_4$ is in a range of about 0.01 mol % to about 0.1 mol %;
   the concentration of NiO is in a range of about 0.05 mol % to about 0.2 mol %;

the concentration of $Cr_2O_3$ is in a range of about 0.01 mol % to about 0.05 mol %;

the concentration of $B_2O_3$, $H_3BO_3$, or a combination thereof, is in a range of about 0.01 mol % to about 0.2 mol %; and the concentration of $Na_2CO_3$ is in a range of about 200 ppm to about 600 ppm.

9. The ZnO based varistor ceramic formulation of claim 1, wherein the $Bi_2O_3$ concentration in the varistor ceramic formulation is in a range of about 0.4 mol % to about 0.8 mol % and the NiO concentration in the varistor ceramic formulation is in a range of about 0.05 mol % to about 0.2 mol %.

10. A zinc oxide (ZnO) based varistor ceramic formed by sintering a varistor ceramic formulation that comprises:

$Bi_2O_3$ at a concentration in a range of about 0.1 mol % to about 1.5 mol %;

$Sb_2O_3$ at a concentration in a range of about 0.01 mol % to about 2.0 mol %;

$Co_3O_4$ at a concentration in a range of about 0.01 mol % to about 1.0 mol %;

$Mn_3O_4$ at a concentration in a range of about 0.01 mol % to about 1.0 mol %;

NiO at a concentration in a range of about 0.01 mol % to about 1.0 mol %;

$Cr_2O_3$ at a concentration in a range of about 0.01 mol % to about 1.0 mol %;

$B_2O_3$, $H_3BO_3$, or a combination thereof, at a concentration in a range of about 0.01 mol % to about 0.2 mol %;

$Na_2CO_3$ at a concentration in a range of about 20 ppm to about 1000 ppm; and

ZnO to 100 mol % based on the total metal and metalloid compounds present in the varistor ceramic formulation.

11. The ZnO based varistor ceramic of claim 10, wherein the $Bi_2O_3$ concentration in the varistor ceramic formulation is in a range of about 0.4 mol % to about 0.8 mol % and the NiO concentration in the varistor ceramic formulation is in a range of about 0.05 mol % to about 0.2 mol %.

12. A zinc oxide (ZnO) based varistor ceramic formed by sintering the ZnO based varistor ceramic formulation of claim 8.

13. The ZnO based varistor ceramic of claim 10, wherein the ZnO based varistor ceramic has a density in a range of about 90% to about 100% of its theoretical density.

14. The ZnO based varistor ceramic of claim 13, wherein the ZnO based varistor ceramic has a density in a range of about 94% to about 96% of its theoretical density.

15. A varistor comprising a varistor body comprising the ZnO based varistor ceramic of claim 10; and metallization layers on opposed outer surfaces of the varistor body.

16. The varistor of claim 15, wherein the varistor's leakage current decreases less than about 20 μA over at least about 480 hours when a maximum continuous operating voltage is applied at about 40° C. with a relative humidity in a range of about 95 to about 98%.

17. The varistor of claim 15, wherein the varistor has a specific resistance in a range of about 11 Ωcm to about 16 Ωcm measured at 0.8 kA (8/20 μs) and at 100 A/cm²; in a range of about 2 Ωcm to about 4 Ωcm measured at 5 kA (8/20 μs) and at 625 A/cm²; and/or in a range of about 1 Ωcm to about 2 Ωcm measured at 10 kA (8/20 μs) and at 1250 A/cm².

18. The varistor of claim 15, wherein the varistor has a protection voltage ($U_p$) in a range of about 200 V to about 265 V as measured at 5 kA (8/20 μs) and/or in a range of about 200 V to about 300 V as measured at 10 kA (8/20 μs).

19. The varistor of claim 15, wherein the varistor has an energy absorption in a range of about 0.4 kJ/cm³ to about 0.9 kJ/cm³.

20. The varistor of claim 15, wherein the varistor ceramic has a grain size in a range of about 2 μm to about 20 μm.

21. An overvoltage protection device comprising the varistor of claim 15.

* * * * *

UNITED STATES PATENT AND TRADEMARK OFFICE
CERTIFICATE OF CORRECTION

| | | |
|---|---|---|
| PATENT NO. | : 11,170,917 B1 | Page 1 of 1 |
| APPLICATION NO. | : 17/245520 | |
| DATED | : November 9, 2021 | |
| INVENTOR(S) | : Cergolj et al. | |

It is certified that error appears in the above-identified patent and that said Letters Patent is hereby corrected as shown below:

In the Specification

Column 2, Line 52: Please correct "7.5 for" to read -- 7.5 μm for --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*